(12) United States Patent
Takatsuji et al.

(10) Patent No.: US 12,431,793 B2
(45) Date of Patent: Sep. 30, 2025

(54) POWER FACTOR CORRECTION SWITCHING POWER SUPPLY DEVICE

(71) Applicant: Murata Manufacturing Co., Ltd., Kyoto-fu (JP)

(72) Inventors: Hiroyuki Takatsuji, Nagaokakyo (JP); Tatsuya Hosotani, Nagaokakyo (JP); Yuki Ishikura, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 127 days.

(21) Appl. No.: 18/334,154

(22) Filed: Jun. 13, 2023

(65) Prior Publication Data

US 2023/0327545 A1    Oct. 12, 2023

Related U.S. Application Data

(63) Continuation of application No. PCT/JP2021/045426, filed on Dec. 10, 2021.

(30) Foreign Application Priority Data

Dec. 21, 2020    (JP) .................................. 2020-210979

(51) Int. Cl.
*H02M 1/44*    (2007.01)
*H02M 1/42*    (2007.01)

(52) U.S. Cl.
CPC ........... *H02M 1/44* (2013.01); *H02M 1/4208* (2013.01); *H02M 1/4233* (2013.01)

(58) Field of Classification Search
CPC ........................ H02M 1/42–4291; H02M 1/44
See application file for complete search history.

(56) References Cited

U.S. PATENT DOCUMENTS 7,215,560 B2    5/2007  Soldano et al.
11,211,872 B1 *  12/2021  Jang ..................... H02M 1/4225
(Continued)

FOREIGN PATENT DOCUMENTS

JP    2005033895 A  *  2/2005
JP    2009-95183 A      4/2009
(Continued)

OTHER PUBLICATIONS

Machine translation of JP 2005033895 A, orig. pub. Feb. 3, 2005. (Year: 2005).*

(Continued)

*Primary Examiner* — Fred E Finch, III
(74) *Attorney, Agent, or Firm* — Studebaker Brackett PLLC

(57) ABSTRACT

A power factor correction switching power supply device includes a power factor correction circuit connected to an alternating-current input line, a first half-bridge capacitor circuit connected between lines of the AC input line, a second half-bridge capacitor circuit connected between lines of a direct-current output line that is closer to a load than a first output capacitor, a common mode choke coil disposed between the first output capacitor and the second half-bridge capacitor circuit, and an electric path configured to electrically connect a midpoint of the first half-bridge capacitor circuit and a midpoint of the second half-bridge capacitor circuit to form a noise balancing circuit. The noise balancing circuit has a potential different from a potential of a ground and is configured to balance common mode noise.

20 Claims, 14 Drawing Sheets

(56) References Cited

U.S. PATENT DOCUMENTS

2016/0308399 A1* 10/2016 Nakamura ............ B60L 53/122
2020/0106354 A1*  4/2020 Matsuura ............. H02M 1/4225
2021/0359594 A1* 11/2021 Zhang .................. H02M 7/219

FOREIGN PATENT DOCUMENTS

| JP | 2015-220953 A | 12/2015 | | |
|---|---|---|---|---|
| JP | 2016-58495 A | 4/2016 | | |
| JP | 2016-158316 A | 9/2016 | | |
| JP | 2018-161024 A | 10/2018 | | |
| JP | 2019-205317 A | 11/2019 | | |
| WO | WO-2019130874 A1 * | 7/2019 | ............ | H01F 17/00 |
| WO | WO-2021230137 A1 * | 11/2021 | | |

OTHER PUBLICATIONS

Machine translation of WO 2019/130874 A1, orig. pub. Jul. 4, 2019. (Year: 2019).*
U.S. Appl. No. 63/024,623, Drawings and Specification as filed on May 14, 2020. (Year: 2020).*
Machine translation of WO 2021/230137 A1, orig. pub. Nov. 18, 2021. (Year: 2021).*
International Search Report issued in PCT/JP2021/045426; mailed Feb. 8, 2022.

* cited by examiner

POWER FACTOR CORRECTION SWITCHING POWER SUPPLY DEVICE

CROSS-REFERENCE TO RELATED APPLICATIONS

This application claims benefit of priority to International Patent Application No. PCT/JP2021/045426, filed Dec. 10, 2021, and to Japanese Patent Application No. 2020-210979, filed Dec. 21, 2020, the entire contents of each are incorporated herein by reference.

BACKGROUND

Technical Field

The present disclosure relates to a switching power supply device that corrects a power factor in a power supply device that receives an alternating-current (AC) voltage and outputs a direct-current (DC) voltage.

Background Art

A power factor correction (PFC) switching power supply device, typically called a PFC converter, is a converter having an AC line as an input and a DC line as an output, and is provided at an AC input portion of a power supply device in order to reduce a decrease in power factor caused by a rectifying and smoothing operation.

Such a PFC switching power supply device needs to use many large-sized common mode choke coils having an impedance in order to reduce the occurrence of electromagnetic interference waves. This leads to an increased size and cost of a filter circuit serving as an EMI noise control circuit, and an increased size and cost of the PFC switching power supply device.

Particularly in a bridgeless PFC converter including no diode bridge circuit, the potential of a DC output line is substantially floating with respect to an earth potential, and thus large common mode noise is generated, and electromagnetic noise resulting from a switching operation is superimposed on an AC input line. As a result, electromagnetic interference waves (EMI noise) occur, and another circuit may be subjected to electromagnetic interference.

SUMMARY

U.S. Pat. No. 7,215,560 discloses a bridgeless PFC converter having a small-size and low-cost circuit configuration of reducing EMI noise. To reduce EMI noise, it is necessary to increase the capacitances of filter capacitors (C1 and C2 described in U.S. Pat. No. 7,215,560) serving as a noise control circuit. However, when the capacitances of these filter capacitors are too large, a circuit that performs feedback control on a switching element in order to stabilize an output voltage may be affected in its operation and may operate abnormally.

To normally perform feedback control, it is necessary to appropriately change an electronic component of the feedback control circuit or to readjust the gain or phase, which gives rise to an issue of a longer design period.

In addition, an increase in the capacitances of the filter capacitors causes an increase in leakage current and a higher risk of an electric shock, which gives rise to an issue of securing safety.

As described above, a PFC switching power supply device is required to simultaneously realize reduced EMI noise, power integrity (securing of power supply quality), a shorter design period of the PFC switching power supply device, and so forth.

Accordingly, the present disclosure reduces an influence of common mode noise on feedback control in a PFC switching power supply device including a feedback control circuit.

A power factor correction switching power supply device according to one example of the present disclosure includes a power factor correction circuit connected to an alternating-current (AC) input line. The power factor correction circuit includes an inductor, a switching circuit configured to cause a switching current to flow through the inductor, a first output capacitor connected to the inductor and configured to smooth a voltage, an output voltage detection circuit configured to detect a voltage of the first output capacitor, and a feedback control circuit configured to control the switching circuit in accordance with a change in a voltage between lines of the AC input line such that a general shape of a waveform of a current flowing through the AC input line follows a general shape of a waveform of a voltage of the AC input line, and control the switching circuit such that an output voltage from the first output capacitor is a predetermined voltage. The power factor correction switching power supply device further includes a first half-bridge capacitor circuit connected between the lines of the AC input line and including two capacitors connected in series to each other; a second half-bridge capacitor circuit connected between lines of a direct-current (DC) output line and including two capacitors connected in series to each other, the DC output line being closer to a load than the first output capacitor; a common mode choke coil disposed between the first output capacitor and the second half-bridge capacitor circuit or between the first half-bridge capacitor circuit and the switching circuit; and an electric path configured to electrically connect a midpoint of the first half-bridge capacitor circuit and a midpoint of the second half-bridge capacitor circuit to form a noise balancing circuit. The noise balancing circuit has a potential different from a potential of an earth or a frame ground and is configured to balance common mode noise.

With this configuration, the noise balancing circuit reduces an influence of common mode noise on the feedback control circuit.

According to the present disclosure, it is possible to reduce an influence of common mode noise on feedback control in a PFC switching power supply circuit.

DETAILED DESCRIPTION

Figure 1:
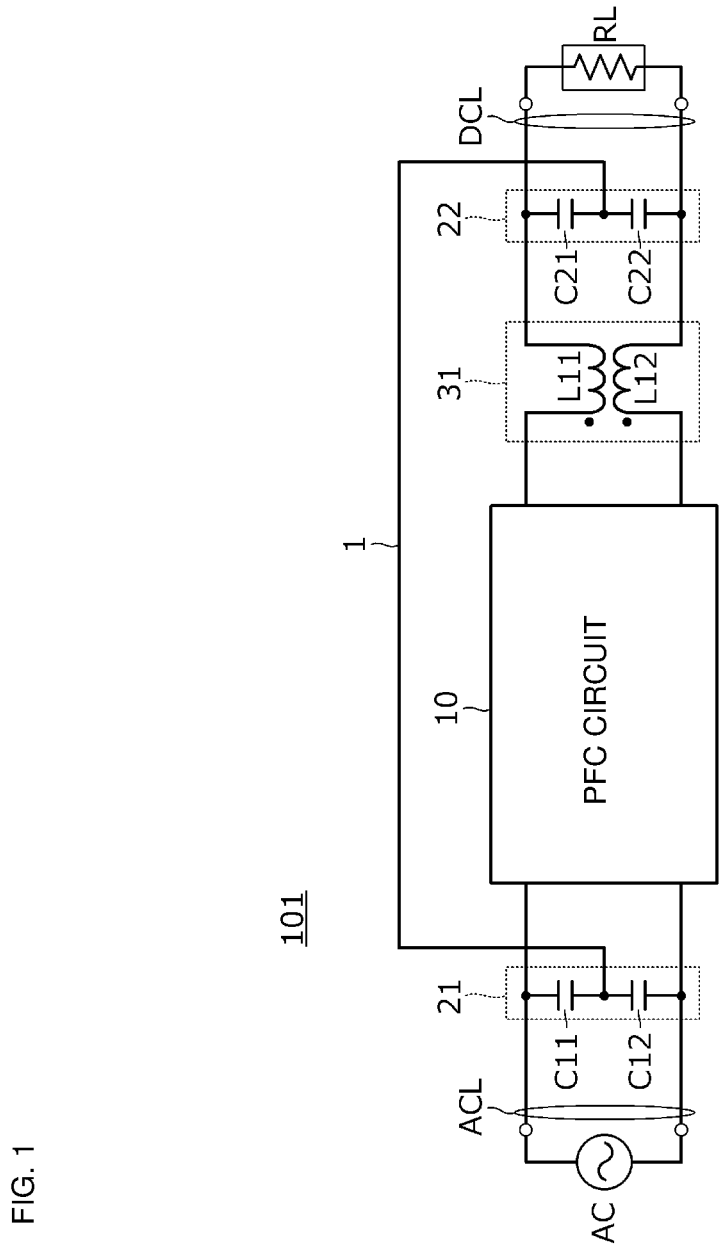
FIG. 1 is a circuit diagram of a power factor correction (PFC) switching power supply device according to a first embodiment.

Hereinafter, a plurality of embodiments for carrying out the present disclosure will be described using some specific examples with reference to the drawings. In the drawings, the same parts are denoted by the same reference numerals. In consideration of ease of description or understanding of the gist, a description will be given using a plurality of embodiments for convenience of description. Configurations illustrated in different embodiments may be partially replaced or combined. In a second and subsequent embodiments, a description of matters common to a first embodiment will be omitted, and only different points will be described. In particular, similar functions and effects obtained from similar configurations will not be repeatedly described in each embodiment.

First Embodiment

FIG. 1 is a circuit diagram of a power factor correction (PFC) switching power supply device 101 according to a first embodiment. The PFC switching power supply device 101 is a circuit connected between a commercial alternating-current (AC) power supply AC and a load circuit RL. The PFC switching power supply device 101 includes an AC input line ACL and a direct-current (DC) output line DCL. The PFC switching power supply device 101 includes a PFC circuit 10, a circuit 21, a circuit 22, and a common mode choke coil 31. The circuit 21 (hereinafter referred to as a "first half-bridge capacitor circuit") is connected between lines of the AC input line ACL and includes capacitors C11 and C12 connected in series to each other. The circuit 22 (hereinafter referred to as a "second half-bridge capacitor circuit) is connected between lines of the DC output line DCL and includes capacitors C21 and C22 connected in series to each other. The common mode choke coil 31 is disposed between the PFC circuit 10 and the second half-bridge capacitor circuit 22.

The PFC switching power supply device 101 includes an electric path 1 that electrically connects a midpoint of the first half-bridge capacitor circuit 21 and a midpoint of the second half-bridge capacitor circuit 22. As a result of the midpoint of the first half-bridge capacitor circuit 21 and the midpoint of the second half-bridge capacitor circuit 22 being electrically connected by the electric path 1, a noise balancing circuit is formed. The noise balancing circuit has a potential different from that of an earth or a frame ground and balances common mode noise. More specifically, common mode noise components have a relatively high frequency and different phases. These common mode noise components flow through the electric path 1 to cancel each other out and to be balanced.

Figure 2:
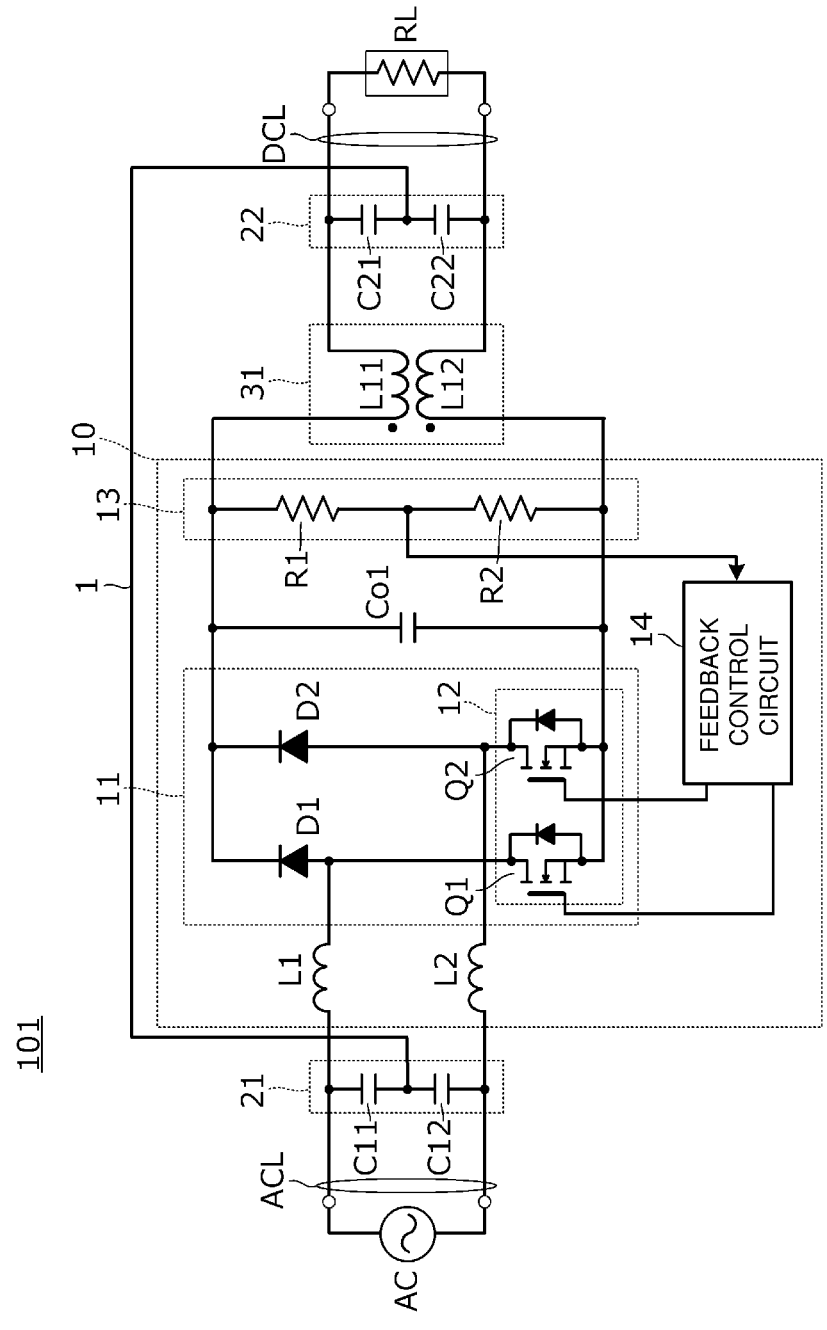
FIG. 2 is a circuit diagram of the PFC switching power supply device, illustrating a specific configuration inside a PFC circuit.

FIG. 2 is a circuit diagram of the PFC switching power supply device 101, illustrating a specific configuration inside the PFC circuit 10. The PFC circuit 10 includes inductors L1 and L2 connected in series to the AC input line ACL, a rectifier circuit 11, a first output capacitor Co1 that smooths an output voltage from the rectifier circuit 11 with a relatively small time constant, an output voltage detection circuit 13 that detects an output voltage from the rectifier circuit 11, and a feedback control circuit 14.

The rectifier circuit 11 includes diodes D1 and D2 and a switching circuit 12. The switching circuit 12 includes switch elements Q1 and Q2. Switching of the switch elements Q1 and Q2 causes switching currents to flow through the inductors L1 and L2. The feedback control circuit 14 controls the switching circuit 12 in accordance with a change in the voltage between the lines of the AC input line ACL such that the general shape of the waveform of the current flowing through the AC input line ACL follows the general shape of the waveform of the voltage of the AC input line ACL, and controls the switching circuit 12 such that an output voltage from the first output capacitor Co1 is a predetermined voltage.

The present embodiment provides the following functions and effects.

As a result of the midpoint of the first half-bridge capacitor circuit 21 and the midpoint of the second half-bridge capacitor circuit 22 being electrically connected by the electric path 1, a balancing circuit for common mode noise is formed. Thus, potential variations of DC output and common mode noise can be reduced while feedback control is hardly affected.

The midpoint of the first half-bridge capacitor circuit 21 is not grounded to an earth or a frame ground. Thus, even if the first half-bridge capacitor circuit 21 employs a large-capacitance capacitor, EMI noise can be reduced without increasing leakage current so much.

The electric path 1 is kept at a potential different from that of the earth or the frame ground. Thus, leakage current does not increase so much, for example, is kept at 1 mA or less, and the risk of an electric shock does not increase.

The common mode choke coil 31 is connected in a subsequent stage of the feedback control circuit 14. Thus, a common mode current flowing through the half-bridge capacitor circuit can be reduced, and an influence on the feedback control circuit 14 can be reduced. Accordingly, both a stable operation of the switching power supply device and reduced EMI noise can be achieved. This eliminates the necessity for adjustment of the feedback control circuit 14, and shortens the design period.

The above-described composite techniques make it possible to implement a PFC switching power supply device that simultaneously achieves a reduced size and cost, reduced EMI noise, power integrity, a shorter design period, and so forth.

That is, the configuration of the PFC switching power supply device 101 makes it possible to form a noise balancing circuit for common mode noise generated by a switching operation, reduce potential variations of DC output and common mode noise, cause feedback control to be hardly affected even when a filter capacitor has a large capacitance, and reduce an increase in leakage current. Furthermore, the configuration of the PFC switching power supply device 101 eliminates the necessity for redesign or the like because feedback control is hardly affected even when a filter capacitor has a large capacitance and an increase in leakage current is reduced, and thus the design period can be significantly shortened. This makes it possible to simultaneously realize reduced EMI noise, power integrity (securing of power supply quality), and a shorter design period of the PFC switching power supply device.

Second Embodiment

A second embodiment exemplifies a PFC switching power supply device including an input capacitor and a PFC switching power supply device including a second output capacitor.

Figure 3:
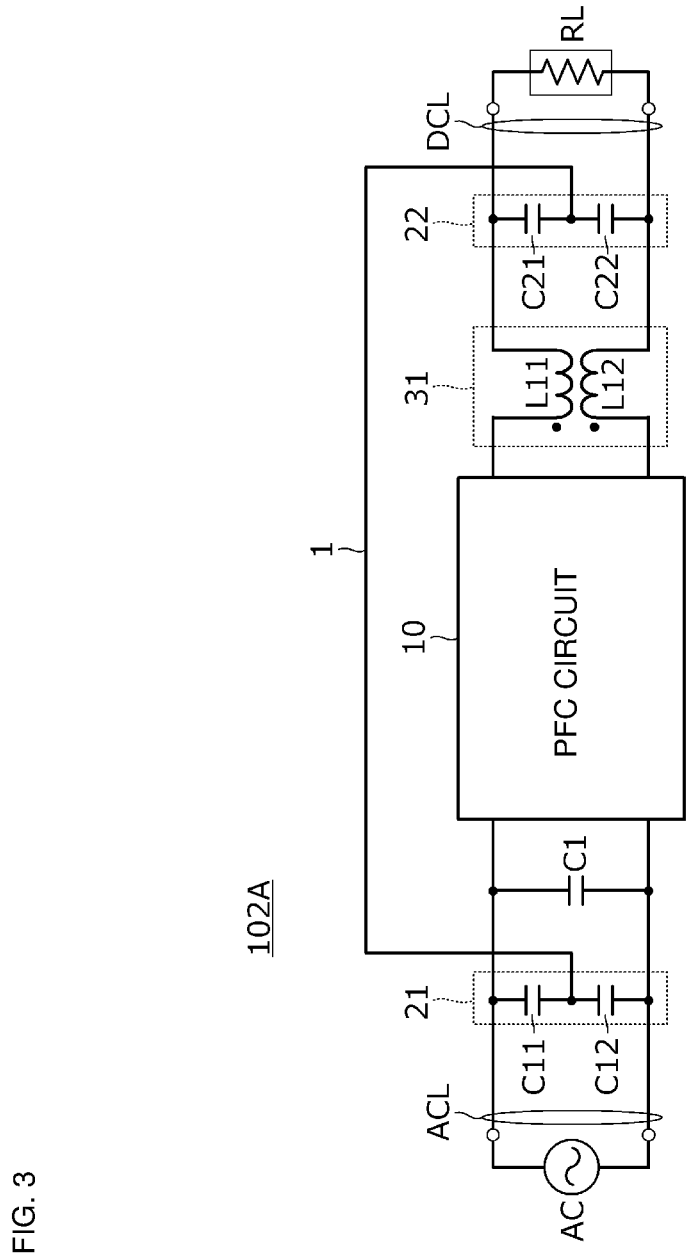
FIG. 3 is a circuit diagram of a PFC switching power supply device according to a second embodiment.

FIG. 3 is a circuit diagram of a PFC switching power supply device 102A according to the second embodiment. The PFC switching power supply device 102A is a circuit connected between a commercial AC power supply AC and a load circuit RL. The PFC switching power supply device 102A includes an AC input line ACL and a DC output line DCL. The PFC switching power supply device 102A includes a PFC circuit 10, a first half-bridge capacitor circuit 21, a second half-bridge capacitor circuit 22, and a common mode choke coil 31. The PFC switching power supply device 102A further includes an input capacitor C1 connected in parallel to the first half-bridge capacitor circuit 21.

As a result of providing the input capacitor C1, the effect of reducing EMI noise increases.

Figure 4:
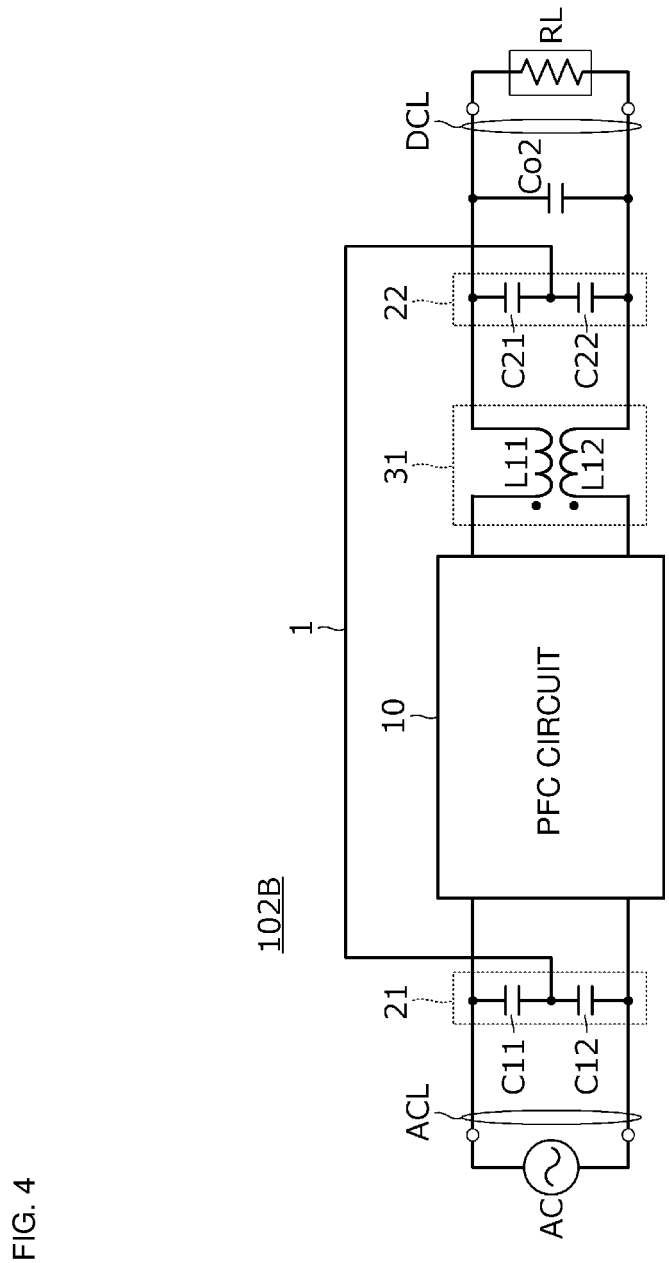
FIG. 4 is a circuit diagram of another PFC switching power supply device according to the second embodiment.

FIG. 4 is a circuit diagram of another PFC switching power supply device 102B according to the second embodiment. The PFC switching power supply device 102B is a circuit connected between a commercial AC power supply AC and a load circuit RL. The PFC switching power supply device 102B includes an AC input line ACL and a DC output line DCL. The PFC switching power supply device 102B includes a PFC circuit 10, a first half-bridge capacitor circuit 21, a second half-bridge capacitor circuit 22, and a common mode choke coil 31. The PFC switching power supply device 102B further includes a second output capacitor Co2 connected in parallel to the second half-bridge capacitor circuit 22.

As a result of providing the second output capacitor Co2, the effect of reducing noise entering from the load circuit RL increases.

Third Embodiment

A third embodiment exemplifies a PFC switching power supply device 103 including an AC line filter circuit.

Figure 5:
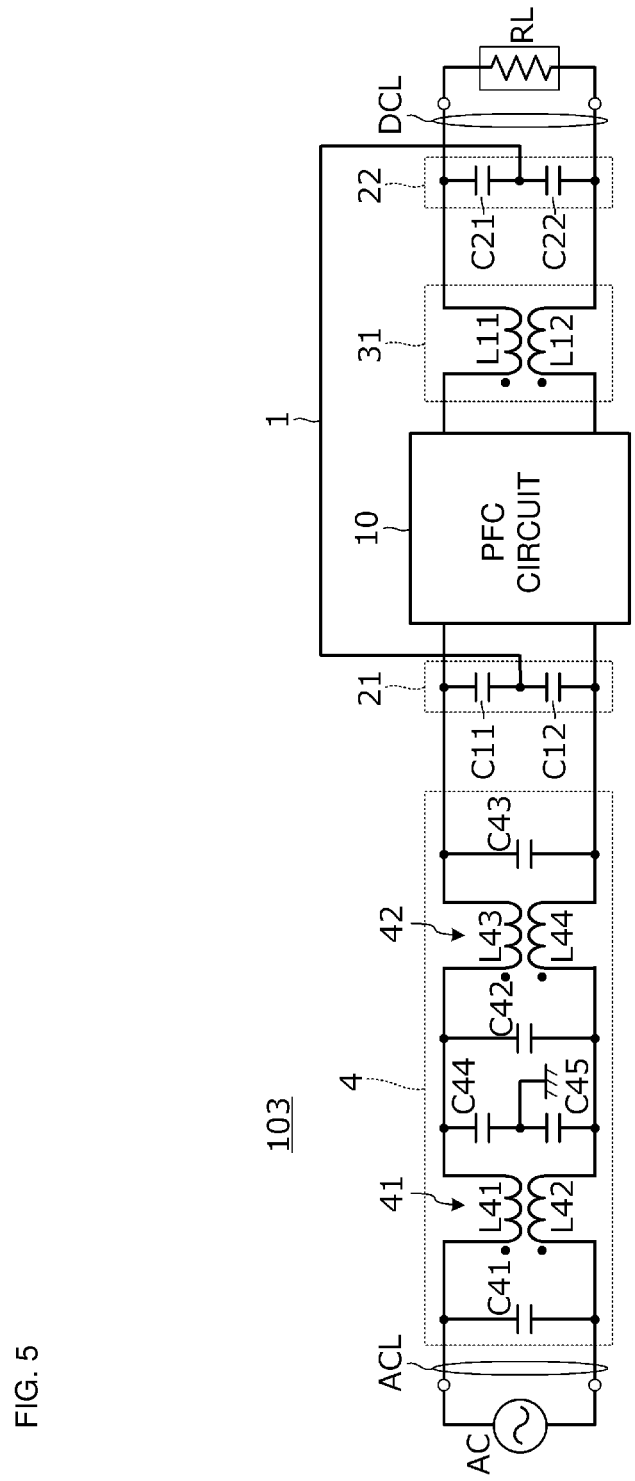
FIG. 5 is a circuit diagram of a PFC switching power supply device according to a third embodiment.

FIG. 5 is a circuit diagram of the PFC switching power supply device 103 according to the third embodiment. The PFC switching power supply device 103 is a circuit connected between a commercial AC power supply AC and a load circuit RL. The PFC switching power supply device 103 includes a PFC circuit 10, a first half-bridge capacitor circuit 21, a second half-bridge capacitor circuit 22, and a common mode choke coil 31 disposed between the PFC circuit 10 and the second half-bridge capacitor circuit 22.

The PFC switching power supply device 103 of the present embodiment includes an AC line filter circuit 4 connected between the AC input line ACL and the first half-bridge capacitor circuit 21.

The AC line filter circuit 4 includes capacitors C41, C42, and C43 connected in parallel between AC lines, a line bypass capacitor circuit including capacitors C44 and C45 connected between the AC lines, and common mode choke coils 41 and 42. The line bypass capacitor circuit has a midpoint grounded to an earth or a frame ground.

As a result of providing the AC line filter circuit 4, the effect of reducing EMI noise further increases. For example, common mode noise in a 150 kHz band, which is a lower band of the frequency band from 150 kHz to 30 MHz, is reduced.

A leakage current flows to the earth or the frame ground through the capacitors C44 and C45 included in the line bypass capacitor circuit. However, the leakage current needs to be, for example, 1 mA or less to prevent an electric shock. For this reason, the capacitances of the capacitors C44 and C45 are not increased so much. Thus, the effect of reducing common mode noise by the line bypass capacitor circuit is not so high. In contrast, the midpoint of the first half-bridge capacitor circuit 21 and the midpoint of the second half-bridge capacitor circuit 22 are not grounded to the earth or the frame ground. Thus, an issue of an electric shock due to a leakage current does not arise, and the capacitance values of capacitors C11, C12, C21, and C22 can be set to be large. This increases the effect of reducing common mode noise.

In addition, coils L11 and L12 included in the common mode choke coil 31 have self-inductance values that are smaller than the largest self-inductance value among the self-inductance values of coils L41, L42, L43, and L44 included in the common mode choke coils 41 and 42 for the AC line filter. For example, the coils L41, L42, L43, and L44 each have an inductance of 1 to 3 mH (several mH order), whereas the coils L11 and L12 each have an inductance of 500 µH (several hundred µH order). This makes it possible to reduce the size and cost of the device.

Fourth Embodiment

A fourth embodiment exemplifies a PFC switching power supply device in which the connection relationship between a common mode choke coil and a PFC circuit is different from that in the foregoing examples.

Figure 6:
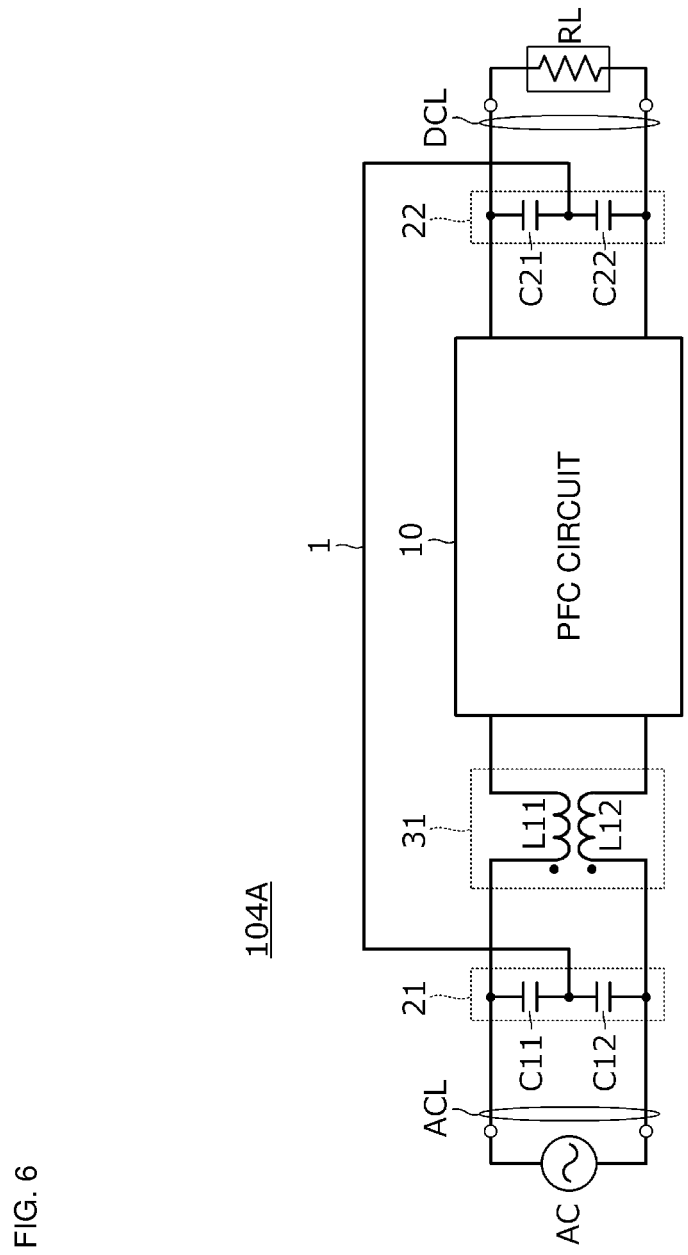
FIG. 6 is a circuit diagram of a PFC switching power supply device according to a fourth embodiment.

FIG. 6 is a circuit diagram of a PFC switching power supply device 104A according to the fourth embodiment. The PFC switching power supply device 104A is a circuit connected between a commercial AC power supply AC and a load circuit RL. The PFC switching power supply device 104A includes an AC input line ACL and a DC output line DCL. The PFC switching power supply device 104A includes a PFC circuit 10, a first half-bridge capacitor circuit 21, a second half-bridge capacitor circuit 22, and a common mode choke coil 31.

In the PFC switching power supply device 101 of the first embodiment, the common mode choke coil 31 is connected between the PFC circuit 10 and the second half-bridge capacitor circuit 22 as illustrated in FIG. 1. In contrast, in the PFC switching power supply device 104A of the present embodiment, the common mode choke coil 31 is connected between the first half-bridge capacitor circuit 21 and the PFC circuit 10.

Figure 7:
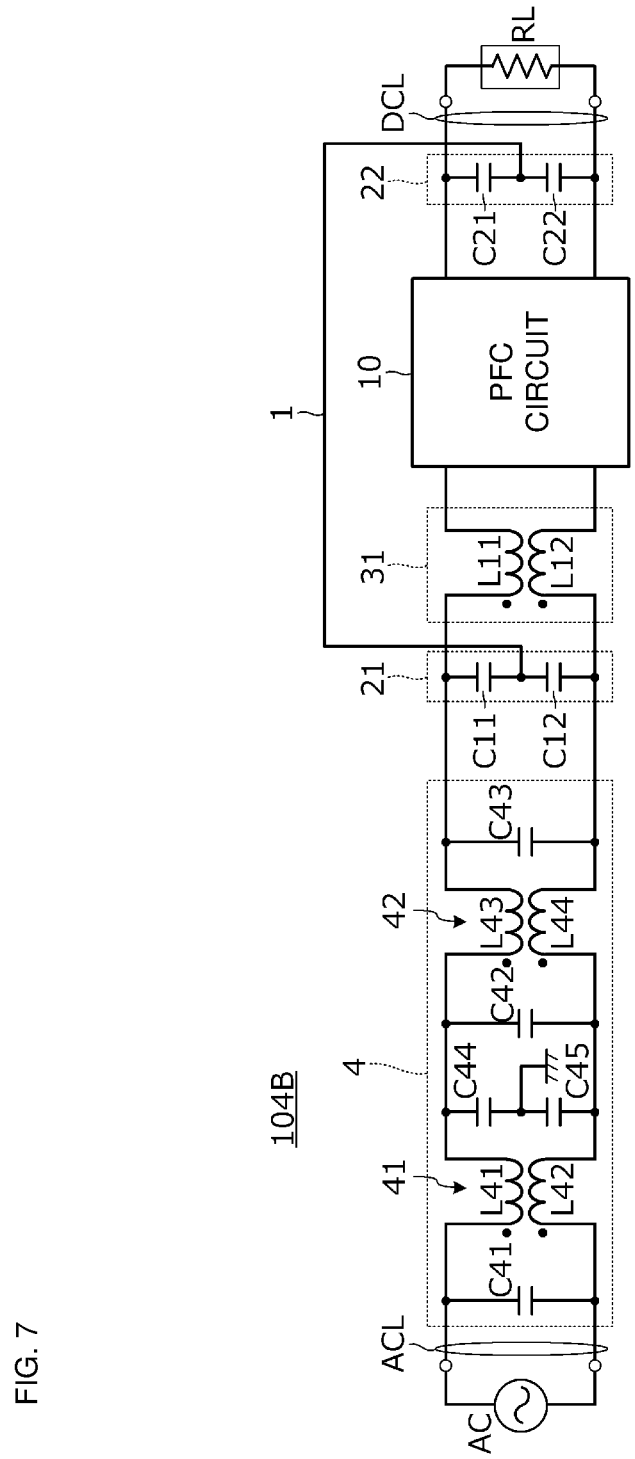
FIG. 7 is a circuit diagram of another PFC switching power supply device according to the fourth embodiment.

FIG. 7 is a circuit diagram of another PFC switching power supply device 104B according to the fourth embodiment. The PFC switching power supply device 104B is a circuit connected between a commercial AC power supply AC and a load circuit RL. The PFC switching power supply device 104B includes a PFC circuit 10, a first half-bridge capacitor circuit 21, a second half-bridge capacitor circuit 22, a PFC circuit 10, and a common mode choke coil 31.

In the PFC switching power supply device 103 of the third embodiment, the common mode choke coil 31 is connected between the PFC circuit 10 and the second half-bridge capacitor circuit 22 as illustrated in FIG. 5. In contrast, in the PFC switching power supply device 104B of the fourth embodiment, the common mode choke coil 31 is connected between the AC line filter circuit 4 and the PFC circuit 10.

Also in the fourth embodiment, functions and effects similar to those in the first embodiment are obtained.

Fifth Embodiment

A fifth embodiment exemplifies a PFC switching power supply device in which an impedance element is connected to an electric path 1.

Figure 8:
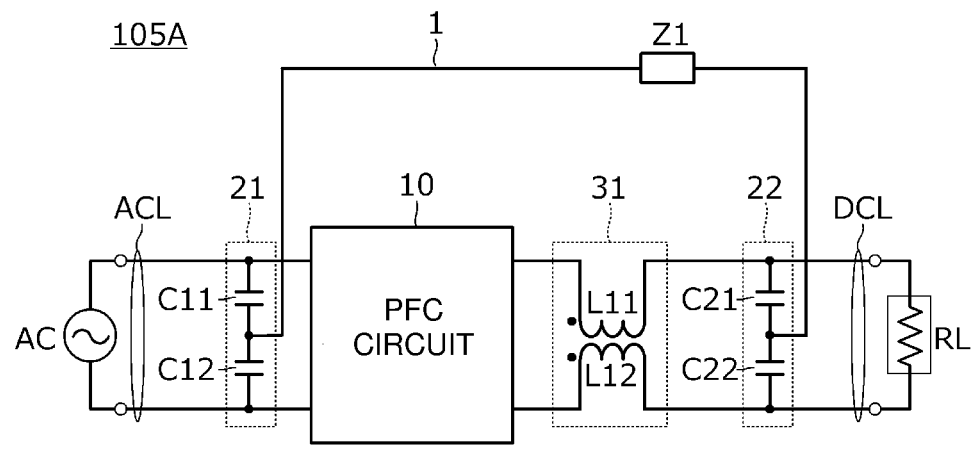
FIG. 8 is a circuit diagram of PFC switching power supply devices according to a fifth embodiment.
Figure 8:
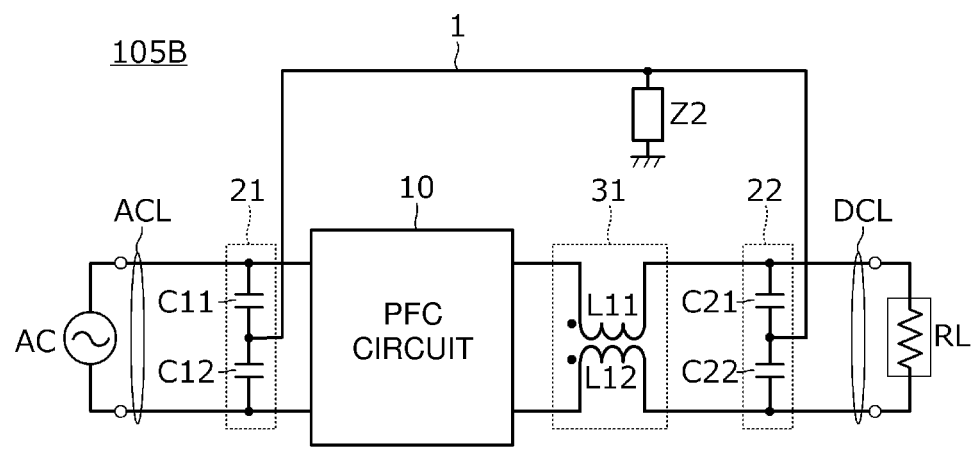

FIG. 8 is a circuit diagram of PFC switching power supply devices 105A and 105B according to the fifth embodiment. The PFC switching power supply devices 105A and 105B each include a PFC circuit 10, a first half-bridge capacitor circuit 21, a second half-bridge capacitor circuit 22, and a common mode choke coil 31. In addition, the PFC switching power supply devices 105A and 105B each include an electric path 1 that electrically connects a midpoint of the first half-bridge capacitor circuit 21 and a midpoint of the second half-bridge capacitor circuit 22.

An impedance element Z1 is connected in series to the electric path 1 of the PFC switching power supply device 105A. The impedance element Z1 has at least an inductance component or a resistance component.

An impedance element Z2 is connected between the electric path 1 of the PFC switching power supply device 105B and a ground. The impedance element Z2 has at least a capacitance component, an inductance component, or a resistance component. The "ground" is an earth or a frame ground.

As a result of connecting the impedance element Z1 in series to the electric path 1 as in the PFC switching power supply device 105A, even if the effect of reducing common mode noise by the common mode choke coil 31 is insufficient, the insufficiency is compensated for by the impedance element Z1. That is, the impedance element Z1 consumes, as heat, the energy that moves to balance the first half-bridge capacitor circuit 21 and the second half-bridge capacitor circuit 22 through the electric path 1, and thus common mode noise is reduced accordingly.

In the PFC switching power supply device 105B, the impedance element Z2 is connected between the electric path 1 and the ground. The impedance element Z2 has at least a capacitance component, an inductance component, or a resistance component.

As a result of connecting the impedance element Z2 between the electric path 1 and the ground, even if the effect of reducing common mode noise by the common mode choke coil 31 is insufficient, the insufficiency is compensated for by the impedance element Z2. That is, the current flowing to balance the first half-bridge capacitor circuit 21 and the second half-bridge capacitor circuit 22 through the electric path 1 flows to the ground through the impedance element Z2. The amount of this current (leakage current) is smaller than the amount of the current that leaks from a line bypass capacitor circuit to the ground when the line bypass capacitor circuit is provided. Thus, the leakage current does not increase, and an influence on the feedback circuit can be further reduced.

Figure 9:
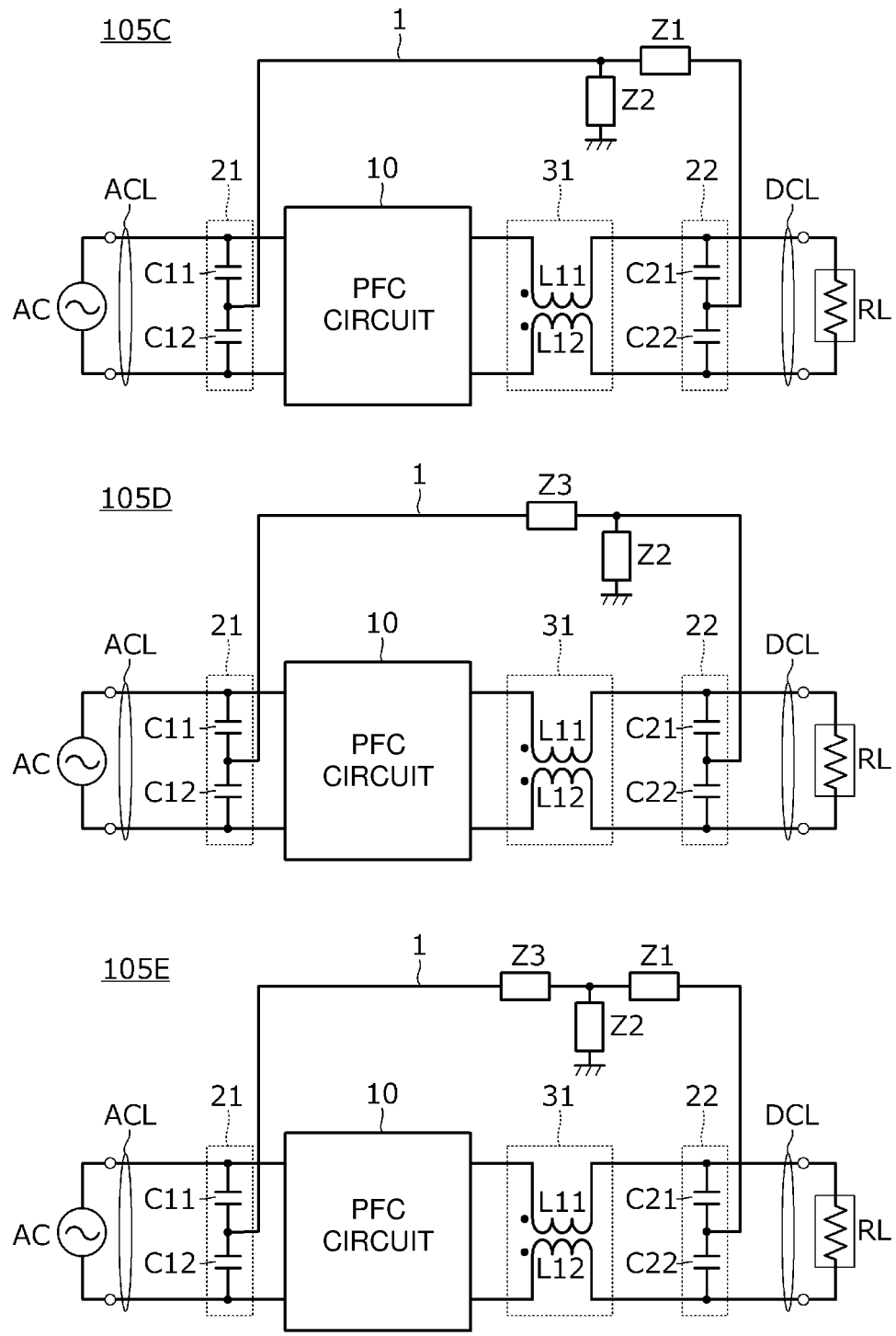
FIG. 9 is a circuit diagram of other PFC switching power supply devices according to the fifth embodiment.

FIG. 9 is a circuit diagram of other PFC switching power supply devices 105C, 105D, and 105E according to the fifth embodiment. In the PFC switching power supply devices 105C, 105D, and 105E, the impedance element Z2 is connected between the electric path 1 and the ground.

In the PFC switching power supply device 105C, the impedance element Z1 is connected in series between a connection point at which the impedance element Z2 is connected to the electric path 1 and the midpoint of the second half-bridge capacitor circuit 22. In the PFC switching power supply device 105D, an impedance element Z3 is connected in series between a connection point at which the impedance element Z2 is connected to the electric path 1 and the midpoint of the first half-bridge capacitor circuit 21. In the PFC switching power supply device 105E, the impedance element Z1 is connected in series between a connection point at which the impedance element Z2 is connected to the electric path 1 and the midpoint of the second half-bridge capacitor circuit 22, and the impedance element Z3 is connected in series between the connection point at which the impedance element Z2 is connected to the electric path 1 and the midpoint of the first half-bridge capacitor circuit 21.

In each of the PFC switching power supply devices 105C, 105D, and 105E illustrated in FIG. 9, when the impedance elements Z1 and Z3 are resistors or inductors and the impedance element Z2 is a capacitor, these impedance elements form a low pass filter. When the impedance elements Z1 and Z3 are capacitors and the impedance element Z2 is a resistor or an inductor, these impedance elements form a high pass filter.

As a result of connecting a frequency filter to the electric path 1 in the above-described manner, it is possible to appropriately determine the responsivity of feedback to the common mode voltage of the AC input line ACL with respect to variations of the common mode voltage output to the DC output line DCL.

Sixth Embodiment

A sixth embodiment illustrates a PFC switching power supply device in which the configurations of a rectifier circuit 11 and a switching circuit 12 are different from those in the above-described examples.

Figure 10:
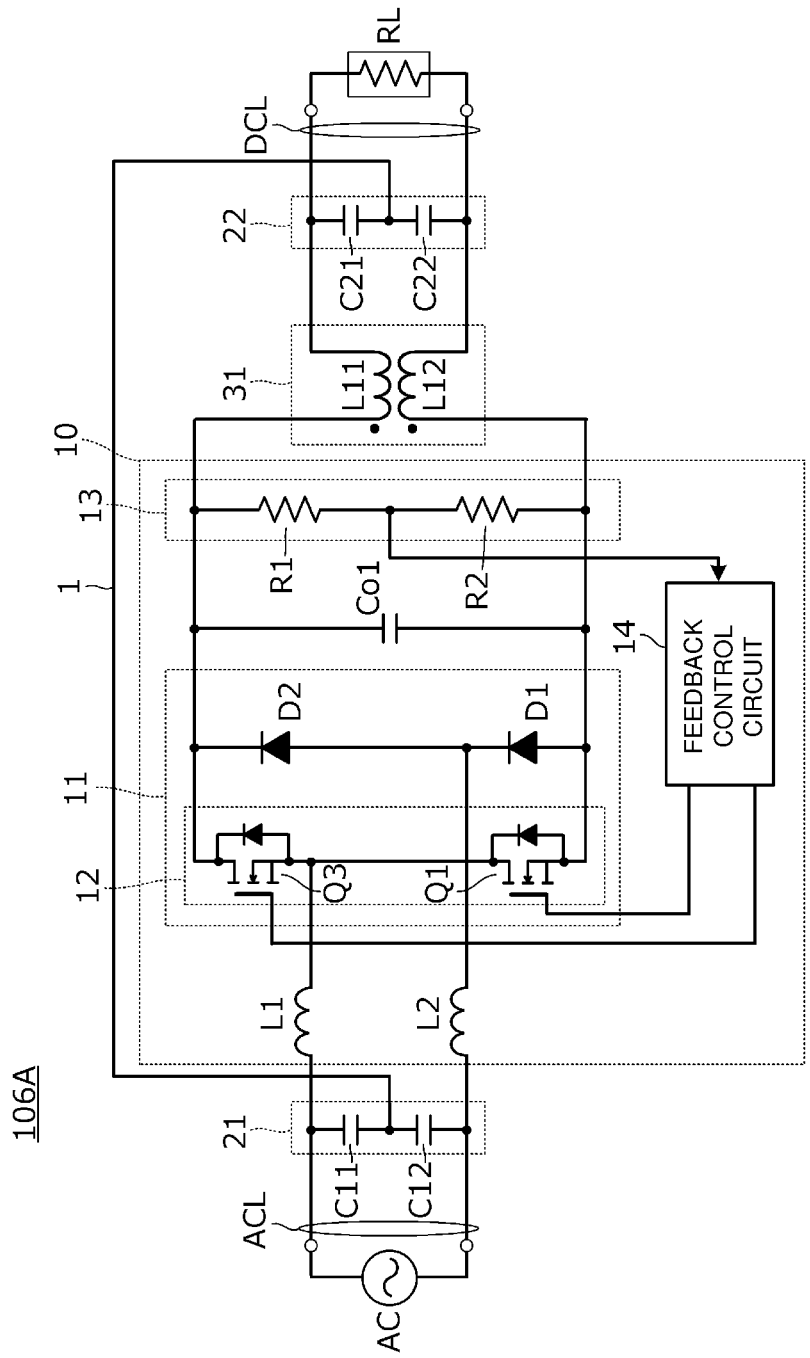
FIG. 10 is a circuit diagram of a PFC switching power supply device according to a sixth embodiment.

FIG. 10 is a circuit diagram of a PFC switching power supply device 106A according to the sixth embodiment. The PFC circuit 10 of the PFC switching power supply device 106A includes inductors L1 and L2 connected in series to an AC input line ACL, a rectifier circuit 11, a first output capacitor Co1 that smooths an output voltage from the rectifier circuit 11, an output voltage detection circuit 13 that detects an output voltage from the rectifier circuit 11, and a feedback control circuit 14.

The rectifier circuit 11 includes diodes D1 and D2 and a switching circuit 12. The switching circuit 12 includes switch elements Q1 and Q3. Switching of the switch elements Q1 and Q3 causes switching currents to flow through the inductors L1 and L2. The configuration of the other part is similar to that of the circuit illustrated in FIG. 2 in the first embodiment. In this way, switch elements may be provided on a high side and a low side.

Figure 11:
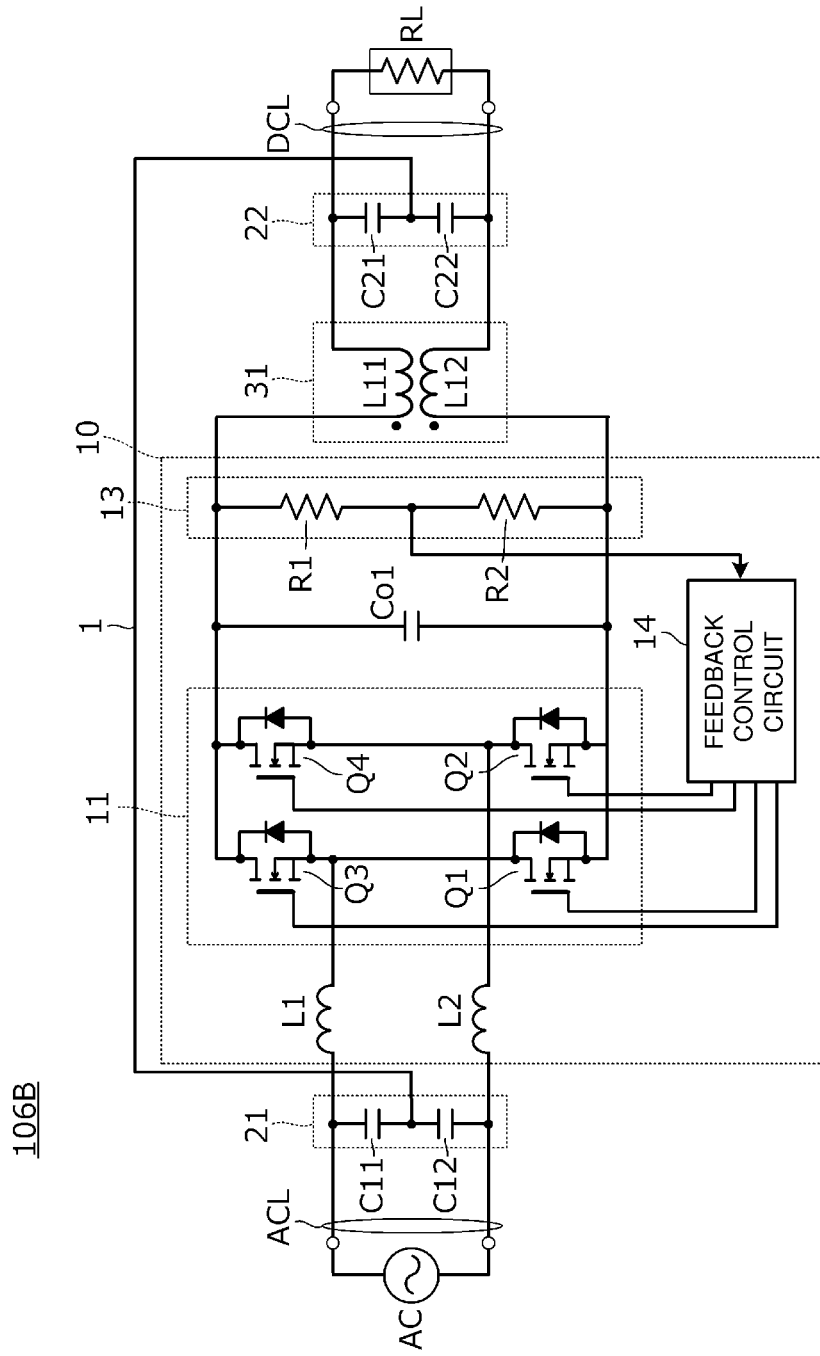
FIG. 11 is a circuit diagram of another PFC switching power supply device according to the sixth embodiment.

FIG. 11 is a circuit diagram of another PFC switching power supply device 106B according to the sixth embodiment. The rectifier circuit 11 of the PFC circuit 10 of the PFC switching power supply device 106B includes switch elements Q1, Q2, Q3, and Q4. Switching of the switch elements Q1, Q2, Q3, and Q4 causes switching currents to flow through the inductors L1 and L2. The configuration of the other part is similar to that of the circuit illustrated in FIG. 2 in the first embodiment. In this way, a switching circuit and a rectifier circuit of a bridge circuit configuration may be formed using four switch elements.

Seventh Embodiment

A seventh embodiment illustrates a PFC switching power supply device in which the configuration of an inductor is different from that in the above-described examples.

Figure 12:
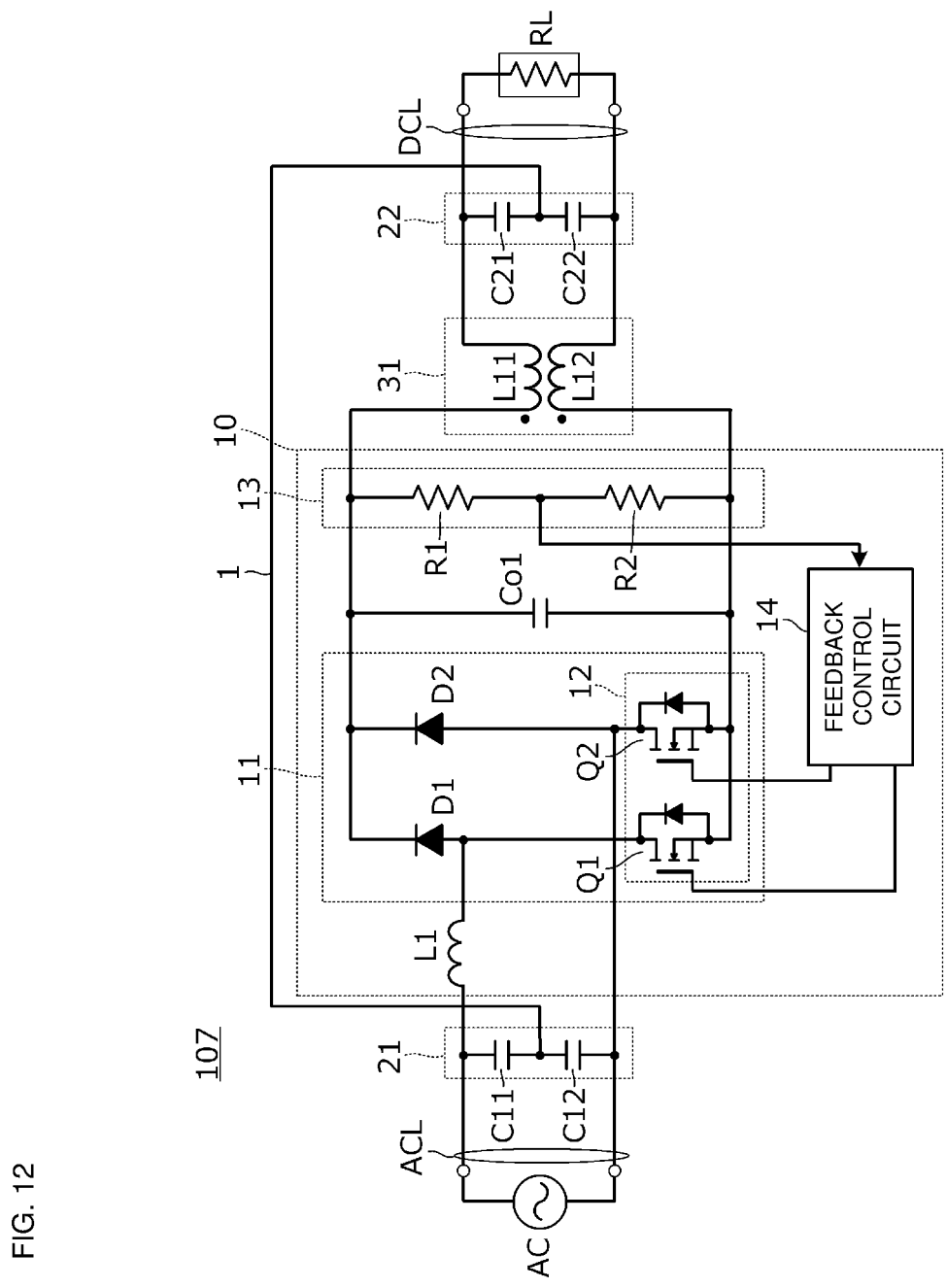
FIG. 12 is a circuit diagram of a PFC switching power supply device according to a seventh embodiment.

FIG. 12 is a circuit diagram of a PFC switching power supply device 107 according to the seventh embodiment. The PFC circuit 10 includes an inductor L1 connected in series to an AC input line ACL, a rectifier circuit 11, a first output capacitor Co1 that smooths an output voltage from the rectifier circuit 11, an output voltage detection circuit 13 that detects an output voltage from the rectifier circuit 11, and a feedback control circuit 14. Unlike the example illustrated in FIG. 2 in the first embodiment, the inductor L1 is connected to only one of the lines of the AC input line ACL. The configuration of the other part is similar to that illustrated in the first embodiment. In this way, an inductor through which a switching current caused by a switching circuit flows may be provided on only one of the lines of the AC input line ACL.

Eighth Embodiment

An eighth embodiment illustrates a PFC switching power supply device in which the configurations of a rectifier circuit 11 and a switching circuit 12 are different from those in the above-described examples.

Figure 13:
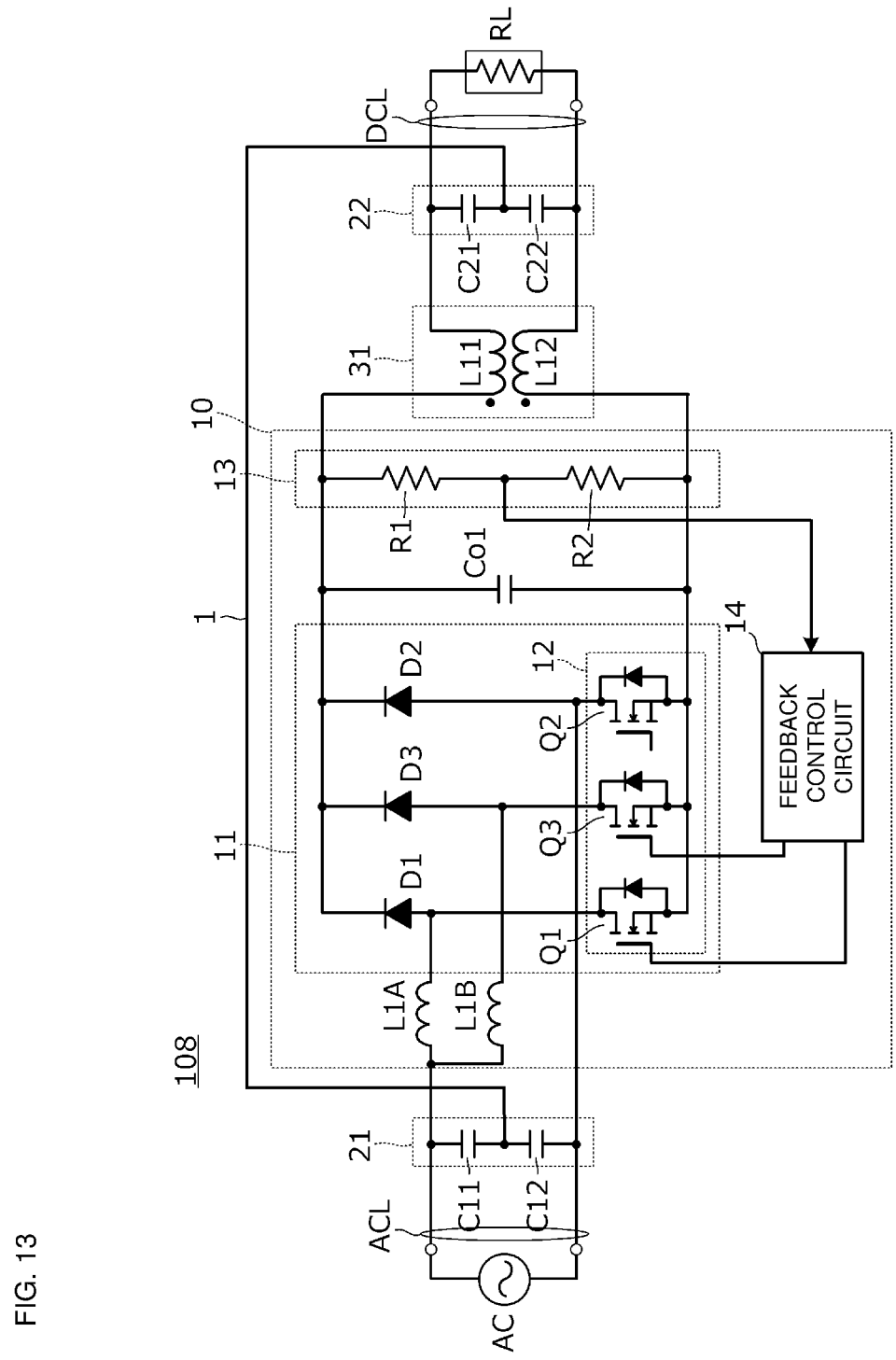
FIG. 13 is a circuit diagram of a PFC switching power supply device according to an eighth embodiment.

FIG. 13 is a circuit diagram of a PFC switching power supply device 108 according to the eighth embodiment. The PFC circuit 10 includes inductors L1A and L1B connected in series to an AC input line ACL, a rectifier circuit 11, a first output capacitor Co1 that smooths an output voltage from the rectifier circuit 11 with a relatively small time constant, an output voltage detection circuit 13 that detects an output voltage from the rectifier circuit 11, and a feedback control circuit 14.

The rectifier circuit 11 includes diodes D1, D2, and D3 and a switching circuit 12. The switching circuit 12 includes switch elements Q1, Q2, and Q3. The diode D1 and the switch element Q1 are connected in series to each other, and one end of the inductor L1A is connected to the connection point therebetween. The diode D3 and the switch element Q3 are connected in series to each other, and one end of the inductor L1B is connected to the connection point therebetween. The diode D2 and the switch element Q2 are connected in series to each other, and the connection point therebetween is connected to, of the AC input line ACL, a line to which the inductors L1A and L1B are not connected.

The feedback control circuit 14 alternately performs turn-ON of the switch elements Q1 and Q2 and turn-ON of the switch elements Q3 and Q2. In this way, the rectifier circuit 11 that performs an interleaving operation may be provided.

Ninth Embodiment

A ninth embodiment exemplifies a PFC switching power supply device including a diode bridge.

Figure 14:
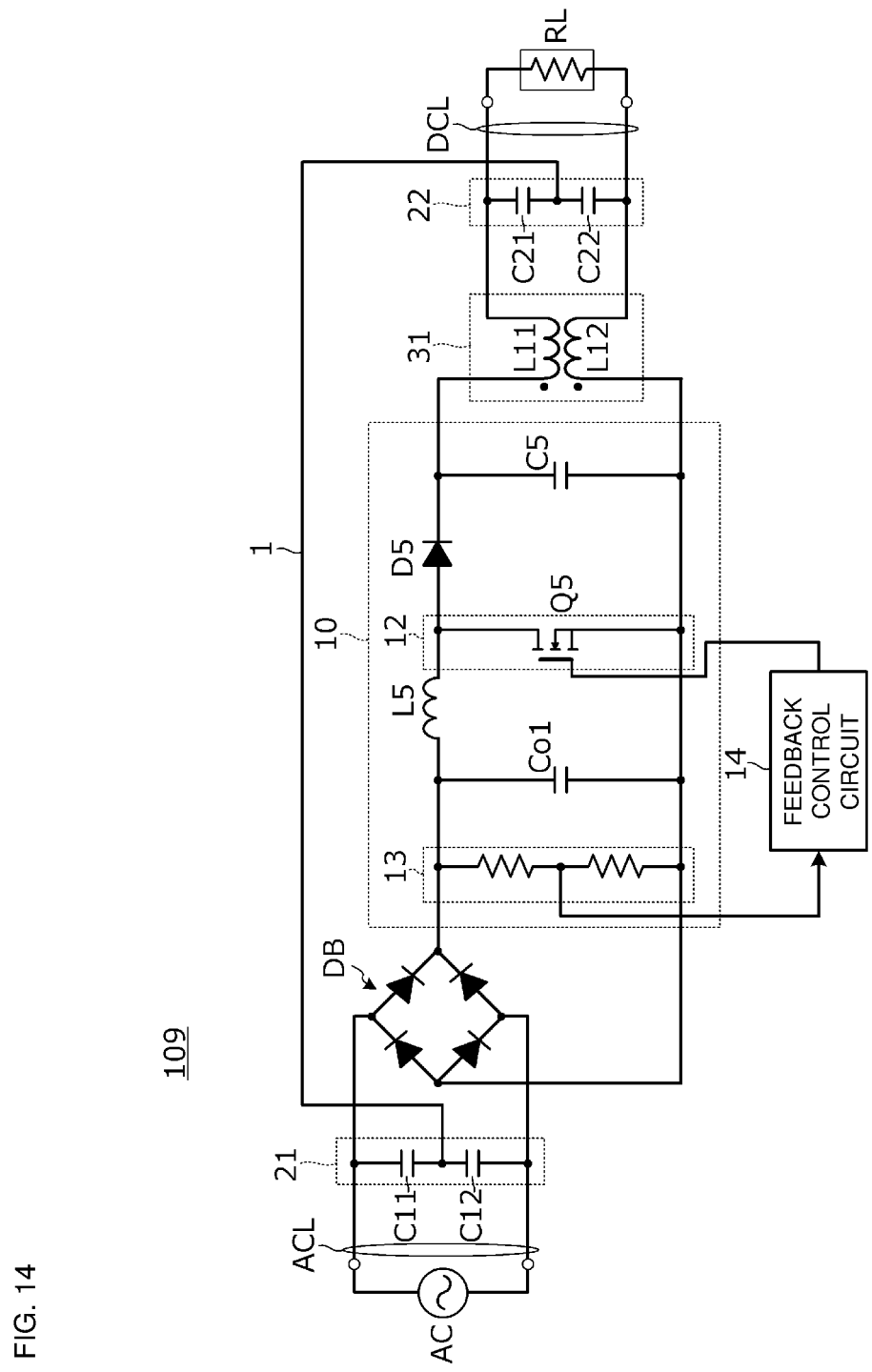
FIG. 14 is a circuit diagram of a PFC switching power supply device according to a ninth embodiment.

FIG. 14 is a circuit diagram of a PFC switching power supply device 109 according to the ninth embodiment. The PFC switching power supply device 109 is a circuit connected between a commercial AC power supply AC and a load circuit RL. The PFC switching power supply device 109 includes a first half-bridge capacitor circuit 21, a second half-bridge capacitor circuit 22, a PFC circuit 10, a common mode choke coil 31, and a diode bridge circuit DB. The first half-bridge capacitor circuit 21 is connected between lines of an AC input line ACL and includes two capacitors connected in series to each other. The second half-bridge capacitor circuit 22 is connected between lines of a DC output line DCL and includes two capacitors connected in series to each other.

The diode bridge circuit DB performs full-wave rectification on an AC voltage of the AC input line ACL. The PFC circuit 10 includes an output voltage detection circuit 13, a first output capacitor Co1, an inductor L5, a switch element Q5, a diode D5, and a capacitor C5.

The inductor L5, the switch element Q5, the diode D5, and the capacitor C5 form a boost chopper circuit. The switch element Q5 forms a switching circuit 12. The feedback control circuit 14 controls the switching circuit 12 in accordance with a change in the voltage between the lines of the AC input line such that the general shape of the waveform of the current flowing through the AC input line ACL follows the general shape of the waveform of the voltage of the AC input line ACL, and also controls the switching circuit 12 such that an output voltage from the first output capacitor Co1 is a predetermined voltage.

The present disclosure is also applicable to a circuit including the diode bridge circuit DB between the AC input line ACL and the switching circuit 12 as illustrated in the present embodiment.

Finally, the present disclosure is not limited to the embodiments described above. Modifications and changes can be made as appropriate by those skilled in the art. The scope of the present disclosure is indicated not by the above-described embodiments but by the claims. Furthermore, the scope of the present disclosure includes modifications and changes from the embodiments within the range equivalent to the claims.

What is claimed is:

1. A power factor correction switching power supply device comprising:
    a power factor correction circuit connected to an alternating-current (AC) input line, the power factor correction circuit including
        an inductor,
        a switching circuit configured to cause a switching current to flow through the inductor,
        a first output capacitor connected to the inductor and configured to smooth a voltage,
        an output voltage detection circuit configured to detect a voltage of the first output capacitor, and
        a feedback control circuit configured to determine a change in voltage between lines of the AC input line based on the voltage of the first output capacitor as detected by the output voltage detection circuit and to control the switching circuit in accordance with the change in a voltage between lines of the AC input line such that a general shape of a waveform of a current flowing through the AC input line follows a general shape of a waveform of a voltage of the AC input line, and control the switching circuit such that an output voltage from the first output capacitor is a predetermined voltage;
    a first half-bridge capacitor circuit connected between the lines of the AC input line and including two capacitors connected in series to each other;
    a second half-bridge capacitor circuit connected between lines of a direct-current (DC) output line and including two capacitors connected in series to each other, the DC output line being closer to a load than the first output capacitor;
    a common mode choke coil between the first output capacitor and the second half-bridge capacitor circuit or between the first half-bridge capacitor circuit and the switching circuit; and
    an electric path configured to electrically connect a midpoint of the first half-bridge capacitor circuit and a midpoint of the second half-bridge capacitor circuit to configure a noise balancing circuit.

2. The power factor correction switching power supply device according to claim 1, further comprising:
a rectifier circuit connected between the AC input line and the switching circuit.

3. The power factor correction switching power supply device according to claim 2, wherein
the switching circuit includes a switching element configuring a part or an entirety of the rectifier circuit.

4. The power factor correction switching power supply device according to claim 1, further comprising:
an input capacitor connected in parallel to the first half-bridge capacitor circuit.

5. The power factor correction switching power supply device according to claim 1, further comprising:
a second output capacitor connected in parallel to the second half-bridge capacitor circuit.

6. The power factor correction switching power supply device according to claim 1, further comprising:
an AC line filter circuit connected between the AC input line and the first half-bridge capacitor circuit.

7. The power factor correction switching power supply device according to claim 6, wherein
the AC line filter circuit includes an AC-line-filter common mode choke coil, and
the common mode choke coil has a self-inductance smaller than a largest self-inductance among self-inductances of the AC-line-filter common mode choke coil.

8. The power factor correction switching power supply device according to claim 1, further comprising:
an impedance element connected in series to the electric path and having an inductance component or a resistance component.

9. The power factor correction switching power supply device according to claim 1, further comprising:
an impedance element connected between the electric path and ground and having a capacitance component, an inductance component, or a resistance component.

10. The power factor correction switching power supply device according to claim 1, wherein
the AC input line as a single-phase AC input line.

11. A power factor correction switching power supply device comprising:
a power factor correction circuit connected to an alternating-current (AC) input line, the power factor correction circuit including
an inductor,
a switching circuit configured to cause a switching current to flow through the inductor,
a first output capacitor connected to the inductor and configured to smooth a voltage,
an output voltage detection circuit configured to detect a voltage of the first output capacitor, and
a feedback control circuit configured to determine a change in voltage between lines of the AC input line based on the voltage of the first output capacitor as detected by the output voltage detection circuit and to control the switching circuit in accordance with the change in a voltage between lines of the AC input line such that a general shape of a waveform of a current flowing through the AC input line follows a general shape of a waveform of a voltage of the AC input line, and control the switching circuit such that an output voltage from the first output capacitor is a predetermined voltage;

a first half-bridge capacitor circuit connected between the lines of the AC input line and including two capacitors connected in series to each other;
a second half-bridge capacitor circuit connected between lines of a direct-current (DC) output line and including two capacitors connected in series to each other, the DC output line being closer to a load than the first output capacitor;
a common mode choke coil between the first output capacitor and the second half-bridge capacitor circuit or between the first half-bridge capacitor circuit and the switching circuit; and
an electric path configured to electrically connect a midpoint of the first half-bridge capacitor circuit and a midpoint of the second half-bridge capacitor circuit to configure a noise balancing circuit, the noise balancing circuit having a potential different from a potential of a ground and being configured to balance common mode noise.

12. The power factor correction switching power supply device according to claim 11, further comprising:
a rectifier circuit connected between the AC input line and the switching circuit.

13. The power factor correction switching power supply device according to claim 11, further comprising:
an input capacitor connected in parallel to the first half-bridge capacitor circuit.

14. The power factor correction switching power supply device according to claim 11, further comprising:
a second output capacitor connected in parallel to the second half-bridge capacitor circuit.

15. The power factor correction switching power supply device according to claim 11, wherein
the AC input line as a single-phase AC input line.

16. A power factor correction switching power supply device comprising:
a power factor correction circuit connected to an alternating-current (AC) input line, the power factor correction circuit including
an inductor,
a switching circuit configured to cause a switching current to flow through the inductor,
a first output capacitor connected to the inductor and configured to smooth a voltage,
an output voltage detection circuit configured to detect a voltage of the first output capacitor, and
a feedback control circuit configured to determine a change in voltage between lines of the AC input line based on the voltage of the first output capacitor as detected by the output voltage detection circuit and to control the switching circuit in accordance with the change in a voltage between lines of the AC input line such that a general shape of a waveform of a current flowing through the AC input line follows a general shape of a waveform of a voltage of the AC input line, and control the switching circuit such that an output voltage from the first output capacitor is a predetermined voltage;
a first half-bridge capacitor circuit connected between the lines of the AC input line and including two capacitors connected in series to each other;
a second half-bridge capacitor circuit connected between lines of a direct-current (DC) output line and including two capacitors connected in series to each other, the DC output line being closer to a load than the first output capacitor;

a common mode choke coil between the first output capacitor and the second half-bridge capacitor circuit or between the first half-bridge capacitor circuit and the switching circuit; and an electric path configured to electrically connect a midpoint of the first half-bridge capacitor circuit and a midpoint of the second half-bridge capacitor circuit to configure a noise balancing circuit, the noise balancing circuit having a potential different from a potential of a ground and being configured to balance common mode noise, wherein the noise balancing circuit is configured to reduce an influence of common mode noise on the feedback control circuit.

17. The power factor correction switching power supply device according to claim 16, further comprising:
a rectifier circuit connected between the AC input line and the switching circuit.

18. The power factor correction switching power supply device according to claim 16, further comprising:
an input capacitor connected in parallel to the first half-bridge capacitor circuit.

19. The power factor correction switching power supply device according to claim 16, further comprising:
a second output capacitor connected in parallel to the second half-bridge capacitor circuit.

20. The power factor correction switching power supply device according to claim 16, wherein
the AC input line as a single-phase AC input line.

* * * * *